(12) United States Patent
Jooris et al.

(10) Patent No.: US 10,140,228 B2
(45) Date of Patent: Nov. 27, 2018

(54) REAL-TIME EXECUTION OF MAC CONTROL LOGIC

(71) Applicants: UNIVERSITEIT GENT, Ghent (BE); IMEC VZW, Leuven (BE)

(72) Inventors: Bart Jooris, Oudenburg (BE); Pieter De Mil, Mariekerke (BE); Lieven Tytgat, Desselgem (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 119 days.

(21) Appl. No.: 15/100,033

(22) PCT Filed: Nov. 27, 2014

(86) PCT No.: PCT/EP2014/075796
§ 371 (c)(1),
(2) Date: May 27, 2016

(87) PCT Pub. No.: WO2015/078961
PCT Pub. Date: Jun. 4, 2015

(65) Prior Publication Data
US 2017/0004102 A1    Jan. 5, 2017

(30) Foreign Application Priority Data

Nov. 28, 2013 (EP) .................... 13194935

(51) Int. Cl.
| | |
|---|---|
| *G06F 13/42* | (2006.01) |
| *G06F 13/362* | (2006.01) |
| *H04L 29/06* | (2006.01) |
| *H04L 29/08* | (2006.01) |
| *G06F 9/54* | (2006.01) |

(52) U.S. Cl.
CPC ............ *G06F 13/362* (2013.01); *G06F 9/545* (2013.01); *H04L 69/12* (2013.01); *H04L 69/28* (2013.01); *H04L 69/32* (2013.01); *H04L 69/324* (2013.01)

(58) Field of Classification Search
CPC ............................... H04L 47/28; H04L 69/28
See application file for complete search history.

(56) References Cited

U.S. PATENT DOCUMENTS

| 2005/0201342 | A1* | 9/2005 | Wilkinson | .......... H04L 12/2856 370/338 |
|---|---|---|---|---|
| 2011/0063988 | A1* | 3/2011 | Lee | .................... H04L 41/5009 370/252 |

OTHER PUBLICATIONS

Extended European Search Report for corresponding European Application No. 13194935.6, dated Jun. 3, 2014.
Hauer, "TKN15.4: An IEEE 802.15.4 MAC Implementation for TinyOS 2," TKN Telecommunication Networks Group, TKN Technical Report TKN-08-003, Mar. 2009, pp. 1-26.
Hill et al. "System Architecture Directions for Networked Sensors," ACM, Nov. 12, 2000, pp. 93-104.

(Continued)

*Primary Examiner* — Hyun Nam
(74) *Attorney, Agent, or Firm* — Workman Nydegger (57) ABSTRACT

A method is provided for time accurate execution of MAC logic on a processor able to drive a radio interface. In a first step, a chain of commands is received annotated with a target chain execution time. In a second step, start execution times for the commands are calculated based on the target chain execution time. Then, the chain of commands is executed on this processor at the start execution times.

12 Claims, 5 Drawing Sheets

(56) References Cited

OTHER PUBLICATIONS

Huang et al., "A High Throughput Medium Access Control Implementation Based on IEEE 802.11e Standard," IEICE Transactions on Communications, Apr. 1, 2010, pp. 948-960, vol. E93B, No. 4.
International Search Report for corresponding International PCT Application No. PCT/EP2014/075796, dated Feb. 19, 2015.
Steiner et al., "C-MAC: A Configurable Medium Access Control Protocol for Sensor Networks," IEEE Sensors 2010 Conference, 2010, pp. 845-848.
Tinnirello et al., "Wireless MAC Processors: Programming MAC Protocols on Commodity Hardware," 2012 Proceedings IEEE Infocom, Mar. 25, 2012, pp. 1269-1277.
RMONI Wireless NV, URL: http://www.rmoni.com/en/products/hardware/rm090, Downloaded May 26, 2016.

\* cited by examiner

REAL-TIME EXECUTION OF MAC CONTROL LOGIC

FIELD OF THE INVENTION

The present invention generally relates to the implementation of Media Access Control protocols or MAC protocols on a processor connected to dedicated hardware. More particularly, it relates to the design, implementation and run-time adaptation of the low level part of the MAC protocol responsible for the time critical functionality of the MAC protocol closely interacting with the Physical Layer or PHY.

BACKGROUND OF THE INVENTION

According to the seven-layer Open Systems Interconnection model, more commonly referred to as the OSI model, the MAC data communication protocol is found in the second layer above the Physical Layer or PHY. The MAC layer is a sublayer of the Data Link Layer interacting directly with the PHY layer.

While the PHY layer defines in which way bits and bytes are transmitted over a specific medium, the MAC layer defines how frames are formatted with these bits and bytes and how and when the frames are to be communicated over the transmission medium towards other terminals in an optimized way, i.e. guaranteeing the best possible performance in terms of throughput, latency, quality of service or other performance metrics.

A MAC layer protocol may be usable for different PHY layer protocols. One example here is the IEEE 802.11 protocol offering wireless access over a variety of transmission mediums and thus PHY protocols. Depending on the application requirements of the communication network, different MAC layer protocols may also be implemented on top of a single PHY layer. For example, in the IEEE 802.15.4e standard multiple MAC techniques such as time slotting, channel hopping, asynchronous multi-channel adaptation, multi-super frames and slot frames are proposed to support a wide range of industrial and commercial applications. As a result, the MAC is a complex algorithm with stringent timing constraints that must execute radio actions, i.e. actions requiring access to the PHY layer, in a time accurate and time critical manner.

Due to the variety of MAC techniques and protocols, even for a single PHY, it is desirable to be able to implement new MAC techniques on top of existing hardware and software platforms. However, this is not always an easy task in existing solutions. In a lot of cases, MAC specific functions are integrated in hardware drivers interacting with the PHY layer in the radio interface in order to meet the critical timing requirements. For example in the 802.11 MAC specification, timings to be met are in the order of microseconds. Therefore, in order to implement new MAC functionality, new drivers must be developed and recompiled which is a complex and time consuming task. Also, as MAC specific code is often mixed with PHY specific code, part of the PHY may need to be re-implemented in order to change the functionality of the MAC layer. Moreover, as drivers typically run as kernel level modules on a processor or embedded processor, it is not straightforward to change MAC functionality or a MAC protocol at run-time without interrupting the system or rebooting the system.

Therefore, it would be desirable to be able to change time critical MAC functionality at run-time without the need for new or adapted drivers that interact with the PHY layer and thus the radio interface.

Several solutions have been proposed to overcome one or more of the above shortcomings. In the domain of Wireless Sensor Networks or WSN, the publication by J. Hauer, TKN15.4: An IEEE 802.15.4 MAC Implementation for TinyOS 2, Technical Report, 2009 presents a platform independent MAC for TinyOS, an operating system often used in wireless sensor platforms. However, parts of the MAC are still implemented in PHY specific drivers and, therefore, their conclusion is that "these [timing] requirements can practically not be met by a platform independent MAC protocol, rather they should be pushed from the MAC to the PHY, ideally to the hardware". Therefore, the time critical MAC logic, sometimes referred to as the Lower MAC or L-MAC, is still platform specific and embedded in PHY specific drivers. As a result, the L-MAC implementation can only be changed by redeveloping drivers and recompiling them into new firmware for the TinyOS operating system.

Another solution in the WSN domain is proposed by R. Steiner, T. Mück, A. Fröhlich in "C-mac: A configurable medium access control protocol for sensor networks, Sensors, 2010 IEEE, pp. 845-848" where a generalized state machine for three major MAC categories is presented, i.e. for channel polling, scheduled contention and time division multiple access. The disadvantage of this solution is that it does not foster the creation of completely new MAC protocols. Moreover, the state machine does not allow fine-grained, time-accurate control of the radio functions as delays are in the order of milliseconds whereas time critical MAC control functions require maximum delays in the order of microseconds. A further disadvantage is that recompilation is needed for every reconfiguration of the MAC protocol.

In the Wireless Local Area Network or WLAN domain, the publication by I. Tinnirello, G. Bianchi, P. Gallo, D. Garlisi, F. Giuliano, F. Gringoli: "Wireless mac processors: Programming mac protocols on commodity hardware", INFOCOM, 2012 Proceedings IEEE, pp. 1269-1277 introduced a programmable wireless platform called Wireless MAC Processors or WMP supporting a MAC defined in terms of a Finite State Machine (FSM). This FSM consists of transitions between states. These transitions can be triggered by events, e.g. a frame is received. The transition will be executed if a certain boolean condition is TRUE, e.g. sending of an acknowledgement or ACK. Before completing the transition to the new state, an action, e.g. the transmission of such an ACK, can be performed. A disadvantage of this solution is that it is impossible to adapt a MAC protocol, i.e. the FSM, at run-time locally on the network interface card. In WMP, an adapted MAC protocol and thus new FSM needs to be recompiled on a remote machine and re-injected in the network interface card.

It is an object of the present invention to obviate the above disadvantages and to provide a way to define MAC control logic—and Lower MAC control logic in particular—that is replaceable at run-time and does not require a recompilation nor a redevelopment of drivers because part of the logic is embedded in these drivers.

SUMMARY OF THE INVENTION

This object is achieved, in a first aspect, by a method for time accurate execution of MAC logic on a processor able to drive a radio interface. In a first step of the method, a chain of commands annotated with a target chain execution time is received. In a second step, start execution times are calculated for these commands based on this target chain execution time. In a last step, this chain of commands is executed on this processor at the start execution times.

The chain of commands is a list of commands that, if executed in combination, defines the complete or part of the MAC logic needed to run the MAC protocol. As it is a chain, the commands are related to each other and are to be executed in a certain order as derivable from the chain.

The target chain execution time annotated to the chain adds a time aspect to the MAC logic according to a certain time reference. This time reference has a resolution and range which is sufficient to support the desired MAC logic and is thus sufficient to accord a time according to a time critical function required by the MAC protocol. Preferably, the resolution is smaller than the effective symbol time of a PHY layer time domain symbol. For example, the resolution may be $1/10^{th}$ of a symbol or 1 microsecond. The time may then be annotated by a single binary symbol. The reference for this time may be absolute or relative. Relative may be relative to a certain event such as for example the reception of a certain time domain symbol. As the target chain execution time is defined within the chain of commands, it may be annotated at the time when the chain is constructed, before it is received.

It is an advantage that MAC logic can be defined by a time annotated chain of commands as the designer of the MAC logic only needs to know the available commands to design time critical MAC logic implementing a complete or a time critical part of a MAC protocol, i.e. a low level MAC. Changing the MAC logic is thus as simple as receiving an updated or new chain of commands that leads to the execution of the commands at the right moment in time.

The MAC logic defined by the chain of commands is executed on the processor, i.e. the commands or functions are called on the processor. In the actual implementation of the function further access to components outside the processor may be done for example to the radio interface implementing further PHY layer functionality or to more specific hardware blocks such as a counter, memory or peripherals. Thus, when executing these commands on the processor, the functions executable on the processor are called whereby further hardware or software components may be accessed.

The calculating of the execution times is done in such a way that the target chain execution time is met. As the MAC logic is specified as a chain of commands, the start execution times of the commands can be derived one after the other starting with the commands where the target chain execution time is annotated. For example, the calculating may go from the end of the chain, command by command, up to the beginning of the chain.

According to a preferred embodiment the chain of commands comprises one master command and slave commands whereby the target chain execution time is annotated to this master command and indicative for when the master command should be executed. The slave commands are relative in time to the master command. The calculating the execution times further comprises:
calculating a master execution time that forms part of the execution times for the master command from the target chain execution time;
calculating slave execution times for the slave commands from the master execution time.

As a MAC implements time critical behaviour, the chain of commands comprises one command, the master command, which sets the time critical aspect in the chain. It is thus the aim of the designer of the chain that the master command is executed according to the target chain execution time as dictated by the MAC protocol. As the commands are relative to one another, i.e. they are to be executed in a certain order, the execution time of the slave commands is related to the execution of the master command. Therefore, the slave execution times that also form part of the execution times are derived such that when executing the slave commands, the master is executed at the annotated time. When executing the chain of commands in the order as defined by the chain, the slave commands are executed at their respective slave execution times and the master commands is executed at the master execution time.

The calculating of the start execution time may thus begin at the master command which is directly derived from the target chain execution time. The calculating then proceeds with the slave command just before the master execution time to derive the start execution time for that command. The calculating is then performed for every slave command up to the beginning of the chain. Slave commands before the master command are also referred to as negative slave commands and slave commands after the master command are also referred to as positive slave commands. In order to be able to calculate the start execution time of the slave commands in such a way that the target chain execution time is met, it is preferred that the negative slave commands follow a single path up to the master command. For the positive slave commands this is not important and, thus, the chain may follow several paths after the master command depending on conditions that are validated at run-time, i.e. during the execution of the commands in the chain.

It is an advantage that the time critical aspect of the MAC protocol is related to a single command of the chain by according the target chain execution time to this single master command. The MAC designer does not need to bother with how and when the slave commands need to be executed as these are derived from the master execution time and thus from the target chain execution time.

The commands may further be callable from appropriate modules able to execute a specific subset of these commands. The executing the chain of commands then further comprises:
calling these commands at the execution times such that their execution starts in the appropriate modules at the execution times.

By relating the execution times to the time where the command or function is called, no further interaction is needed with the module in order to guarantee the timely execution of the command. This way, the implementation of the function of command is abstracted from the chain of commands and no further knowledge is needed about the internal implementation of the command or function in the module.

Modules and more specifically software modules offer a way of abstraction for executing the chain of commands. Several modules may offer the same functions or commands but may have several implementations depending on the underlying hardware they access. It is therefore an advantage that the same chain of commands for a specific MAC protocol may be used even when different hardware is used just by using a different module offering the same functionality, i.e. commands or functions.

Advantageously, the modules are kernel modules or kernel level modules. When a function is executed in a kernel module the processor may be in a privileged state better known as kernel mode. When the kernel module is implemented in an operating system or OS, the OS will normally execute the kernel module or functions in the kernel modules when the processor is in kernel level mode. A kernel level module may have direct access to privileged operations, to the hardware and may control some of the hardware such as for example the radio interface. This way a kernel module may be a driver to some of the hardware connected to the processor. Implementing the modules as kernel level modules has the advantage there is privileged control of the timely execution of the commands.

When using these modules, the calculating the execution times may further comprise:

retrieving an execution duration for one of the commands from a respective module indicative for how long it needs to execute this one command;

calculating an execution time of this one command from this execution duration, from already calculated execution times of other commands in the chain and from the master execution time.

As the module comprises the implementation of the command or function, it comprises the way a command is implemented and thus how long it takes to perform one of the commands. It is thus an advantage that the start execution times are retrieved from the modules allowing different execution duration for a specific command dependent on the module implementing that command. For example, a radio interface A and radio interface B may offer the same command for switching an antenna from receive to transmit mode. The duration of the switching may however be different for interface A and B. Therefore, depending which interface is used, i.e. which radio interface module is used, the retrieved duration will be different although the chain of commands remains the same. This allows using the same chain of commands for a MAC protocol for different radio interfaces.

Optionally, when using modules for the execution of the commands, the module may be a state keeping module able to execute a first command of the chain. This state keeping module can be in a state comprising one of stable states or one of transient states. This first command can be a state changing command thereby changing the state upon execution or can be a non state changing command thereby not changing the state upon execution. The executing the commands then comprises:

checking the state of the state keeping module;

only calling the first command at the state keeping module if the first command is such a non state changing command or if the first command is a such state changing command and the state keeping module is in a stable state.

In other words, when a module is in a stable state it may only have its state changed to a transient state by a state changing command and thus by a command that changes its state from a stable state to a transient state. A command that changes the state from stable to transient may only be invoked when the module is in a stable state, hence the checking of the state before calling the command or function. When a module is in a transient state it may change its state during the execution of a command, it may change its state back to a stable state. An automatic state change in a module being it transient to transient or transient to stable may further be triggered by a predefined time or by an external event. State keeping modules may further comprise several stable and transient states. During execution of a command, a module may thus go from one transient state to another. To come back to the radio interface module of before, it may have gone from a receiving state to a turnaround state to a transmitting state and finally back to the receiving state. From these states, only the receiving state is a stable state while the turnaround and transmitting states are transient states. It should further be noted that a non state changing command can be called even when the module is in a transient state as the non state changing command does not interfere with the state of the module, being it transient or stable.

Advantageously, if this first command is such a state changing command, it comprises a subchain of subcommands. The calling of the commands of the chain then comprises:

executing the subcommands one after the other after calling the first command in the state keeping module. Thereby, the state keeping module is in a first one of the stable states before executing the first command and is in a second one of the stable states after executing the subcommands and is in one of the transient states upon executing the subcommands.

In other words, the execution of a command in a state keeping module is further refined as a succession or chain of commands, i.e. a subchain with subcommands, within the module itself. At the beginning of the execution of the first command, the module is in a stable state as required for the execution of a state changing command. The execution of the subcommands may then change the state of the module to transient states whereby the execution of the last subcommands brings the module back to a stable state. The state keeping module is thus in a stable state before and after the execution of the state changing command but in one or more transient state during the execution of the subcommands. The state keeping module may further be in the same stable state before and after the execution of the subchain, i.e. the first and second one of the stable states are then the same stable states.

More advantageously, the subcommands comprise a first subcommand changing the state of the state keeping module to a first transient state of the transient states after executing the first command. Thereby, the first transient state is designated as blocking by the first command. The executing the subcommands then comprises:

executing the first subcommand in the subchain thereby changing the state to this first transient state designated as blocking;

by the blocking proceeding to executing a next command in the chain of commands following the first command while continuing the execution of the subcommands related to the first command.

A transient state which is an intermediate state during the execution of a command, more specifically during the execution of the subcommands of a subchain, may thus also be designated as a blocking state. While a state is a transient state by definition as a property of a state keeping module, the designation of it to be blocking is determined by the state changing command it executes. In other words, it is within the definition or design of the chain of commands that a transient state of a module is blocking upon execution of a specific command. During executing of the first command the module may go from one transient state to another as it goes from one subcommand to another in the subchain until it reaches a transient state which is designated as a blocking state. At that moment, the next command in the chain may be started, i.e. execution can begin and thus this next command is called at the appropriate module. In the meanwhile the first command continues execution until it finishes its execution ending in a stable state.

The advantage of designating a transient state as blocking is that a first module can process or perform the execution of a first command in the chain while next commands are already started without having the risk that one of these next commands would affect the execution of the first command in the chain. This is accomplished by the fact that the first commands has left the module in a transient state thereby preventing the execution of another state changing command in that same module. The designation of blocking states thus allows parallel execution of commands in a chain. By assigning a state of a state keeping module as a blocking state for a certain command in the chain, a MAC designer may choose to have commands executed in parallel.

Furthermore, if a command has subcommands by a subchain and this command corresponds to the master command, then the target execution time may be annotated to one of the subcommands in the subchain indicative for when it should be executed.

In other words, while subcommands are not used in the chain of commands, they can be used to annotate the time critical aspect of the MAC logic, i.e. the target chain execution time. This allows annotating the chain with a finer granularity while maintaining commands in the chain that are not necessarily specific to a single MAC protocol. For example, referring back to the example of the radio interface module, the target chain execution time may indicate the time at which the interface, i.e. the PHY layer, should start transmitting the packet. The command to do so would then first perform a subcommand to switch the interface from receiving to transmitting followed by the subcommand for the actual transmission of the packet. By annotating the target chain execution time to this subcommand this may be accomplished without exposing the complexity of the subcommands to the chain and thus to the designer of the MAC logic.

The executing the chain of commands may further be repeatedly performed. Thereby, it is a property of the chain that is executed repeatedly. For example, the chain may be executed again as soon as it has finished. Or the chain may be executed again at a specified time interval after the target chain execution time.

As a MAC protocol typically shows a lot of repeating behaviour, for example by beacons, this allows to reuse the chain for reoccurring events thereby avoiding receiving the same chain of commands over and over again.

The chain of command may be received from a user level application running on the processor. Preferably, the user level application runs in a user level mode of an operating system running on this processor. As the chain only has a time annotated to it but does not implement the way the execution times should be met, the receiving of the chain is not time critical in se. Therefore, when executing a first chain of commands performing a first MAC logic according to a first MAC protocol, a second chain of commands may be received from a user level application. As the MAC logic is a series of commands, no critical interaction is needed with the user level application because the user level application is not responsible for the timely execution of the commands. It is thus an advantage that several MAC logic implementations may be designed and ran on the processor without software compilation of the MAC logic, but just by loading a new chain of commands from the user level application.

Alternatively, the chain of commands may also be received from a remote application on another processor. Indeed, as the chain itself does not specify how the timely execution of the commands should be met, the chain may be received from any application at any location. This may for example be done over a network connection connecting the remote processor with the processor executing the chain. This allows designing, executing and swapping MAC logic from a remote location without recompiling nor rebooting the processor running the chain of commands.

According to a second aspect, the invention relates to a digital storage medium encoding a machine-executable program of instructions to perform the method according to first aspect.

According to a third aspect, the invention relates to a processor configured to perform the method according to the first aspect.

BRIEF DESCRIPTION OF THE DRAWINGS

FIG. 2 illustrates a chain of commands where one command comprises several subcommands with states assigned to;

DETAILED DESCRIPTION OF EMBODIMENT(S)

The invention will be better understood upon reading the preferred embodiment below. In this embodiment further references will be made to examples relating to the implementation of MAC protocols and logic on top of a PHY according to the IEEE 802.15.4 protocol, i.e. relating to Wireless Sensor Networks or WSNs.

Figure 1:
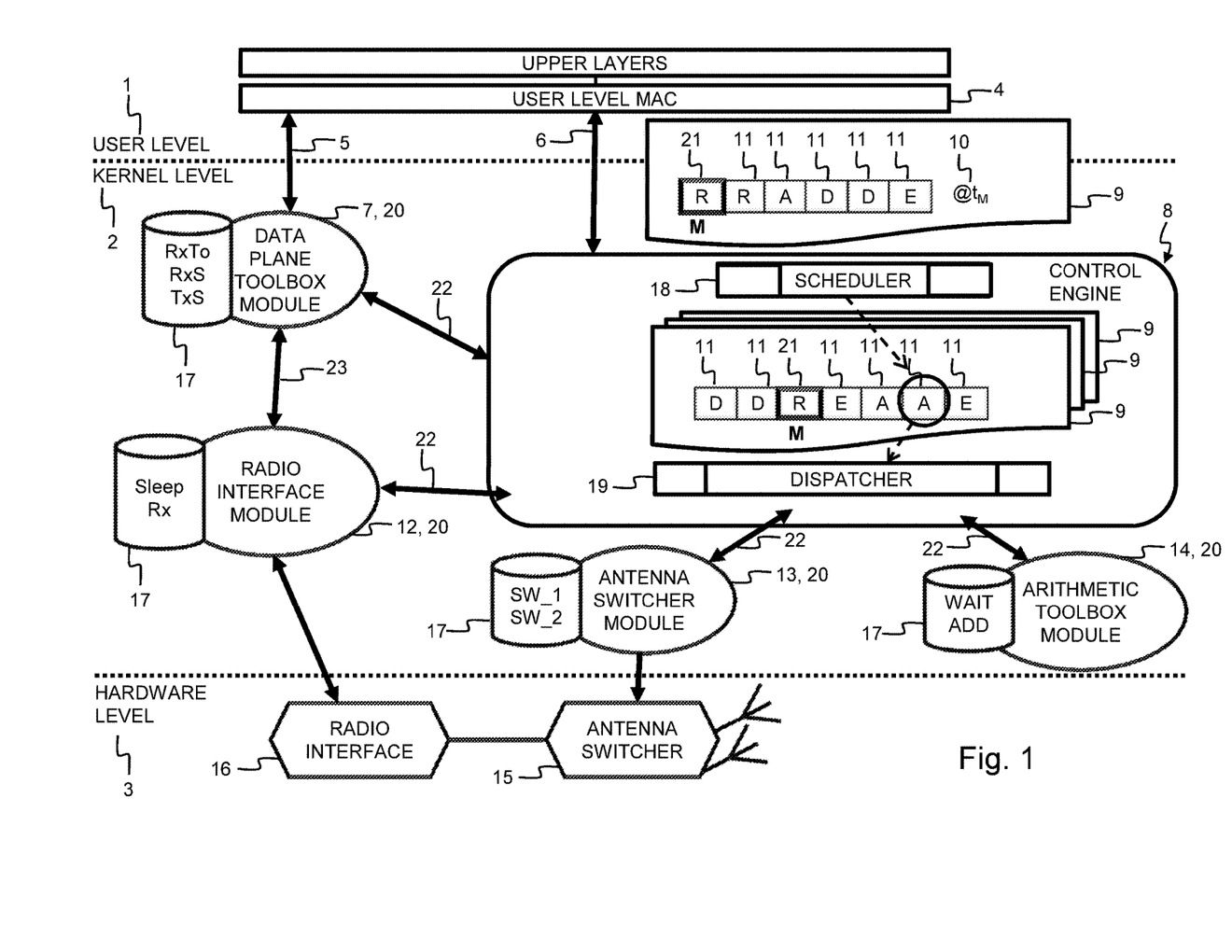
FIG. 1 illustrates a control engine for executing a chain of commands at different modules according to a preferred embodiment of the invention.
Figure 2:
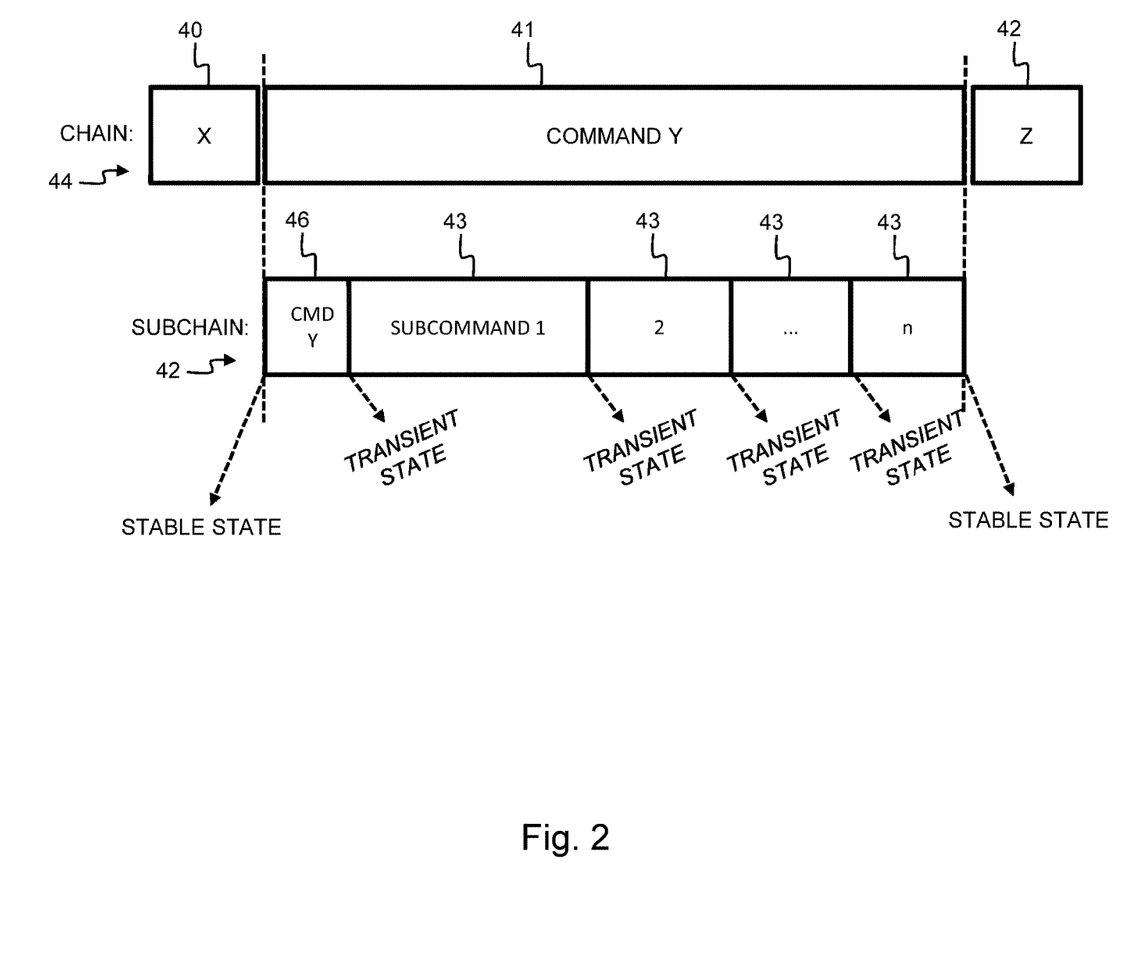

FIG. 1 shows an exemplary implementation of a generic MAC and PHY hardware abstraction architecture. A user level MAC 4 implemented in a user level 1 has two interfaces towards a kernel level 2. These user level and kernel levels corresponds to two modes of a processor on which the MAC is implemented. A first interface, the data interface 5, exposed by the kernel level Data Plane Toolbox module 7 is used for sending and receiving MAC frames. The second interface, i.e. the control interface 6, exposed by the kernel level Control Engine 8 is used for posting MAC protocol logic from the user level MAC 4 to the Control Engine 8. Through this Control Plane interface, one or more time annotated chains 9 can be posted. From the perspective of the Control Engine 8, this engine 8 receives a chain 9 annotated with a target chain execution time 10. Such a chain is composed of commands 11 and 21 and is used to describe MAC protocol logic. These commands are implemented in the modules 7, 12, 13 and 14. A module may be a general toolbox such as for example the data plane toolbox module 7 and arithmetic toolbox module 14, or may provide a hardware abstraction towards a specific chip or hardware. For example, the antenna switcher module 13 provides a hardware abstraction towards a specific piece of hardware 15 for switching the antennas of the radio interface and the radio interface module 12 provides a hardware abstraction towards the radio interface hardware 16 implementing the PHY layer. In FIG. 1, each letter in the commands 21 and 11 refer to the module where they are to be executed. Thereby 'R' refers to the radio interface module 12, 'D' refers to the data plane toolbox module 7, 'A' refers to the arithmetic toolbox module 14 and 'E' refers to commands implemented by the Control Engine 8 itself. Each module comprises a library of commands 17 which is exposed over a command interface 22 to the control engine 8. Based on the target chain execution times 9 annotated to each posted chain 9, a scheduler 18 which is part of the control engine 8 will sort the posted chains 9. Via the dispatcher 19 each command in a chain 9 and thus each chain of commands is executed just in time by the appropriate module. In order to execute the command 21 in the chain in time, the control engine 8 will calculate start execution times for commands 11 and 21 in the chain based on the target chain execution time. The commands 11 and 21 are then executed at the appropriate start execution times.

A conventional upper MAC, i.e. the part of the MAC running in the user level mode on a processor, cannot reach sufficiently accurate timings in the order of microseconds precision and, therefore, a lower level MAC implemented at a kernel level and thus running in kernel level mode is needed. With the software architecture of FIG. 1, the user level MAC can decide, in advance, when exactly an action or command must be executed without being constrained by the kernel drivers. Such an action or command may for example be a command to turn the radio interface 16 on, to set the channel, to listen for incoming packets or to check a bit in a received frame.

The module 20 is a software entity that comprises the implementation of a set of commands 11 and 21 that can be part of a chain of commands 9. A module may also keep a state and each module has a library 17 of commands which it exposes to the control engine 8. As the modules 20 are responsible for the execution of the commands, the control engine 8 will, when the commands are to be executed at their start execution times, call the commands 11 and 21 from the libraries 17 in the appropriate modules 20.

In order to facilitate the execution of a chain of commands 9, only one command or master command 21 in a chain 9 may have the desired target chain execution time 10 annotated to it. This target chain execution time or master time is thus a time relative to a certain reference time. The other commands 11 in the chain 9, i.e. the slave commands 11 are then relative to the requested target chain execution time. Slave commands that are to be executed before the master time have negative relative times and are also referred to as negative slave commands while slave commands that need to be executed after the master time have positive relative times and are also referred to as positive slave commands. It is the purpose of the control engine 8 to have, for each chain 9, the master command 21 completed according to the target chain execution time. Therefore, negative slave commands must be executed sequentially. It is not allowed for negative slaves to take an alternative path. This is because the master command should be executed by the requested master time. If alternative paths before the master command would be allowed, it could not be determined by the control engine 8 when to start the first slave command. The slave times are however not to be annotated in the chain 9, as the control engine 8 will first calculate at which time the master command should be executed in order to meet the target chain execution time 10. Then, as the negative slave commands have a fixed time relation with the master command, the control engine will calculate the start execution times for the slave commands based on the start execution time for the master command. The start execution times for the slave commands thus correspond to the times at which the dispatcher 19 and thus the control engine 8 will call the functions or commands at the appropriate libraries 17 associated with the appropriated modules 20.

A command which is callable from the control engine 8 and implemented in a module 20 is a primitive action and may have, optionally, further additional parameters that may be specified as part of the chain. A command may also change the state of a module after it has been executed. A command may also be of a certain type indicating how it should be called from the chain by the control engine 8.

A chain 9 is used for describing the MAC protocol logic as a sequence of these commands 11. Based on command types, it is determined how commands are organized in the chain and how the control engine 8 may jump from one command to the other. In a default implementation the control engine 8 may jump from one command to the other in a sequential order, i.e. according to the order defined by the chain 9.

As already stated above, a module may also have a state, where the module's state may be used to verify whether the execution of a command is allowed or not. For example, the command "turn on the radio interface" from the module 16 may only be executed if the state before executing this command is "OFF". After successful execution of this command, the state will be set to "ON".

States may further be distinguished as stable states or transient states whereby state changing commands must always start from a stable state and end in a stable state in the case where the module keeps a state. The transient states only last for a pre-defined time. Therefore, when the control engine 8 has to call a command from a module that keeps states, it will first check the state of that module. If the module is in a transient state, it will only call the command if the command is not a state changing command. If the module is in a stable state, it will call the command regardless of the type of the command. For the radio interface module 12 for example, stable states may be:

"OFF": the radio interface is powered off;
"SLEEP": the radio interface is in power saving sleep state;
"ON": the radio interface is on;
"RX": the radio interface is in receive mode where it is able to receive packets.

For the same module 12, transient states may for example be:

"RXTXTURNAROUND": the interface is switching from the stable RX state to the transmit state TX;
"TX": the interface is transmitting a packet;
"TXRXTURNAROUND": after transmission, the interface is switching back to the stable RX state.

Figure 5:
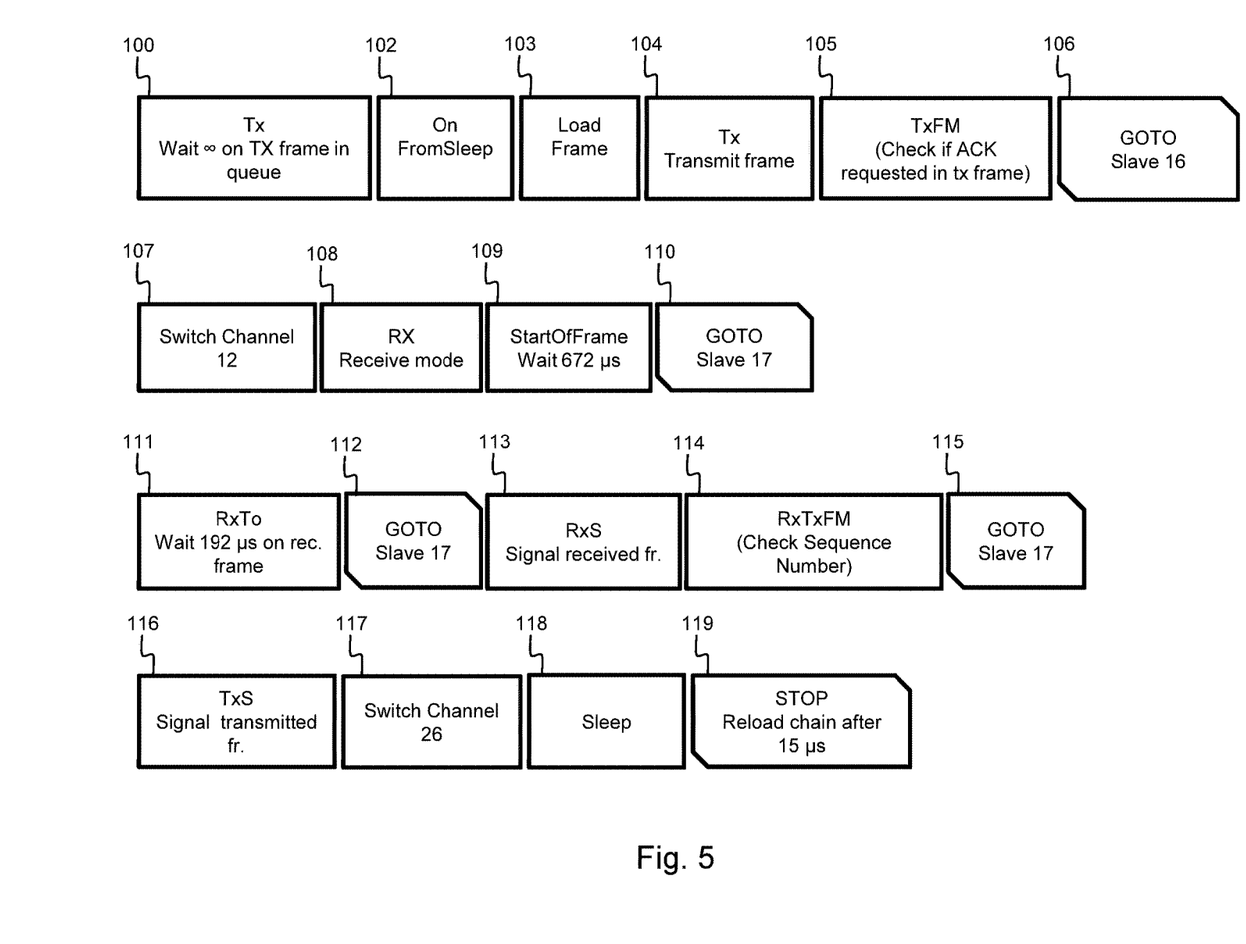
FIG. 5 illustrates a chain of commands implementing MAC control logic according to the IEEE 802.15.4e standard.

In order to have a module in several transient states before ending in a stable state, subchains may be used as illustrated in FIG. 5. A subchain 45 is a sequence of one command 46 corresponding to the command 41 in the chain followed by a series of n subcommands 43. In the chain of commands 44 posted by the user level MAC, an individual subcommand may not be called directly. The subcommands 43 are called one after the other automatically within the module implementing the command. A subcommand 43 may start and end with a transient state, as long as the start and the end of the subchain 42 have stable states.

In the example of the radio interface module 12, the module may expose a TRANSMIT command for use in a chain 9 that is responsible for transmitting a certain MAC frame over the radio interface 16. During the executing of the TRANSMIT command, the module will go from the stable state RX back to the stable state RX in the following order:

RX→RXTXTURNAROUND→TX→TXRXTURN-
AROUND→RX whereby each state change is the result of a subcommand causing the module to go from one state to the other.

According to the preferred embodiment, apart from exposing the commands to the control engine 8, a module 20 also offers the control engine 8 a way to retrieve how long it will take to finalize a specific command taking into account any parameters that may be passed along with the command. This way, the control engine 8 may retrieve a duration indicative for how long it would take to execute the commands from the chain 9 in each respective module 20. These execution durations may be specific for certain implementations of a certain command or for a certain module. For example, depending on the chipset used for the radio interface 16, the receive-to-transit turnaround time may be different and thus the time to transmit a packet may be different depending on the used radio interface. The execution times may therefore be implemented in the modules 20 based on lookup tables that will report a different execution time depending on the underlying hardware. The execution durations retrievable from the modules make it easy to calculate the start execution times of the negative slave commands because, when starting from the start execution time of the master command 21, the start execution times of the negative slave commands may be calculated backwards towards the beginning of the chain by subtracting every time the execution duration of the previous slave command.

As indicated above, the user level MAC 4 is not allowed to call the modules commands 11 directly. Instead, the MAC protocol logic is designed by the MAC designer by composing commands into the chains 9 whereby the purpose of a chain is to have a time accurate execution of the MAC protocol logic.

Taking the example where the transmission of a frame is to be executed at a certain time, most likely some steps need to be taken in order to be able to execute this task at the requested time. For example, the radio might need to be switched on, the frame needs to be loaded into the radio buffer, the correct transmit power might need to be set or the radio interface needs to be switched to transmit mode. All these actions need to be performed until, finally, the transmission of the frame at the desired time can be started. Even after the transmission further action might also be needed, for example shutting down the radio as fast as possible in order to save power.

Figure 3:
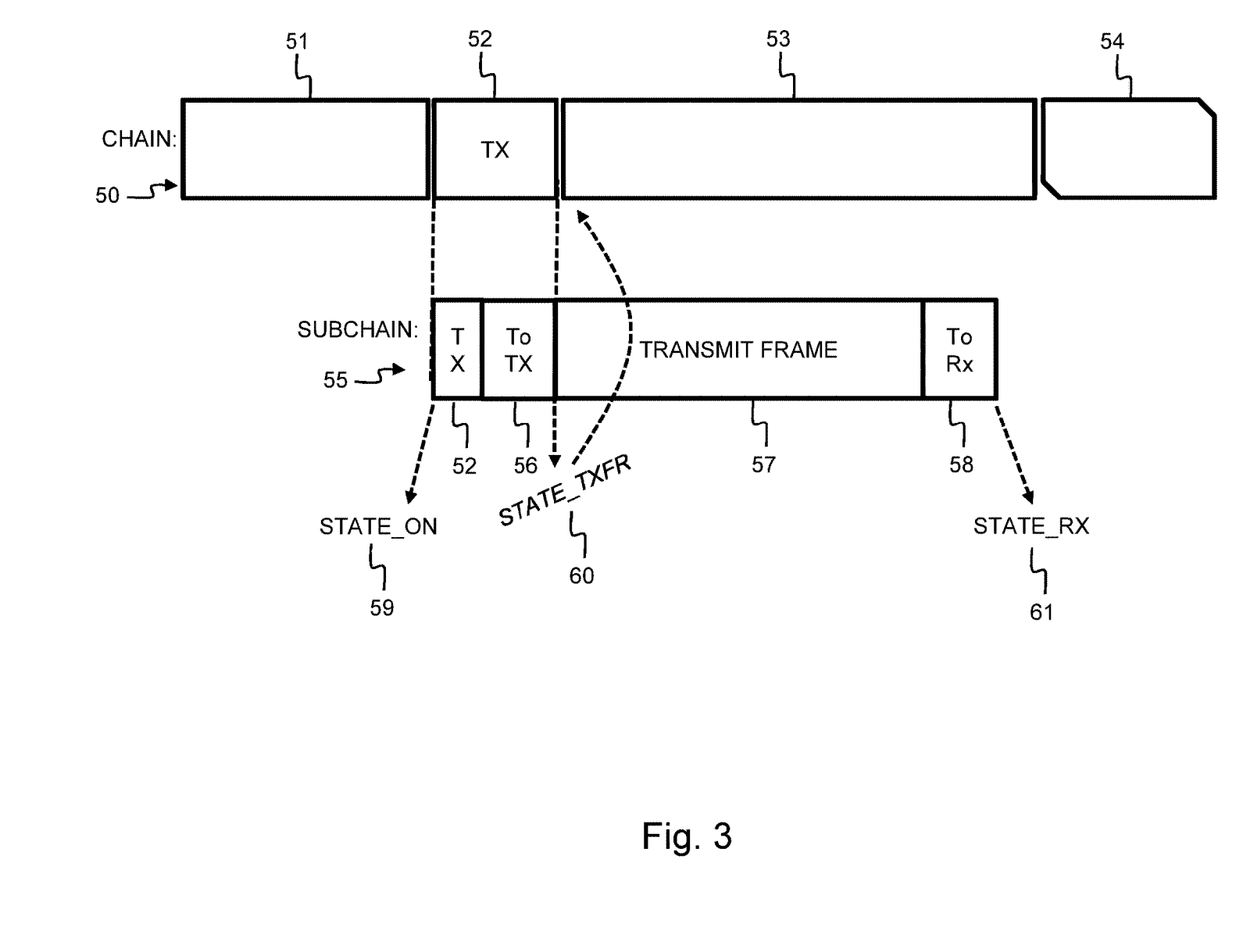
FIG. 3 illustrates a chain of commands where a transient state of a module is designated as a blocking state.

The execution of a next command may be started by the control engine 8 before or during the execution of a subcommand in the chain 9. This is illustrated by FIG. 3. There, a chain 50 comprising four commands 51 till 54 is shown. As illustrative example, the command 52 may be a transmit command implemented in the radio interface module 12 of FIG. 1. The command 52 further comprises three subcommands 56, 57 and 58 respectively for switching the radio interface to transmit mode, for effectively transmitting the frame and for switching the interface back to receive mode. The module implementing the command 52 goes from the stable state STATE_ON 59 to the transient state STATE_TXFR 60 to the final state STATE_RX 61 during the execution of the command 52 in the chain. Within the MAC logic it may be desirable to have a next command 53 started while the previous command is being executed. Therefore, one of the states of the module implementing the transmit command 52 may be annotated as a blocking state in the chain 50. In this example, the state STATE_TXFR 60 is annotated as a blocking state in the chain 50. Therefore, when the subcommand 56 is finished executing and the module enters the state STATE_TXFR, the control engine 8 will start the execution of the next command 53 while the previous command 52 is still being executing in the respective module. One restriction is that the next command 53 may not change the state of the module that is already executing the previous state changing command. Therefore, the control engine 8 will first check if a module is in a stable state before calling a state changing command from a module. In other words, the next command 53 may be executed in the same module as the previous command as long as the command 53 is not a state changing command.

Figure 4:
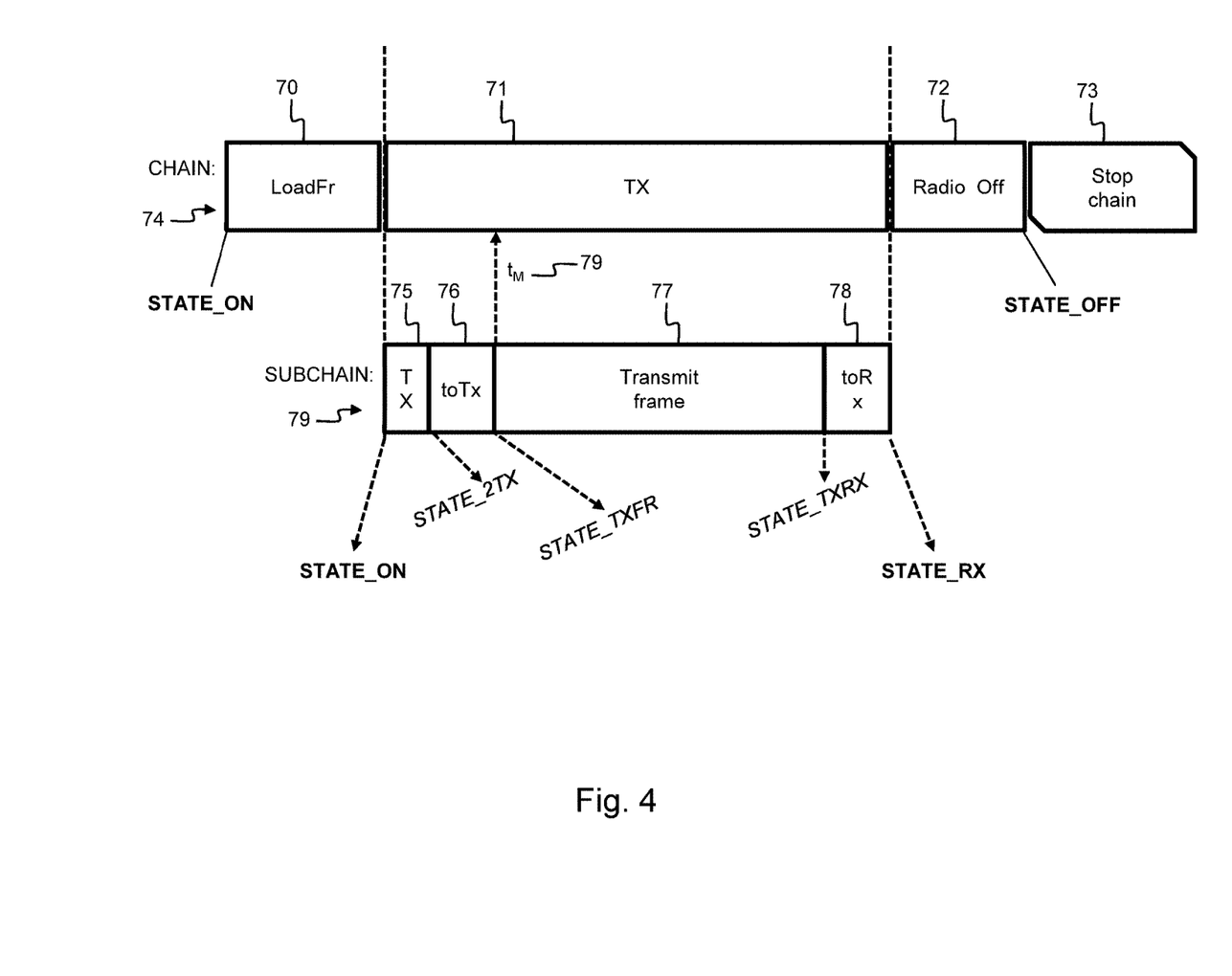
FIG. 4 illustrates a chain of commands where the target chain execution time is annotated to a subcommand of a command.

The execution of the master command is defined by the master time or target chain execution time, thus the time that the master command should be executed. This target execution time may refer to the execution of the master command but also to the execution of the subcommands comprised in the master command. This is illustrated in FIG. 4 where a chain 74 is shown comprising four commands 70 till 73 of which a TX command 71 corresponding to the TX command 52 of FIG. 3. In this example the target chain execution time 79 is annotated to the execution of the subcommand 76 in the chain 9 and thus to the start of the transmission of a frame by the radio interface module. As the subcommands are identifiable in the chain, this annotation may be done in the chain 74 when posting the chain to the control engine. Hereby, when scheduling the commands in the chain 74, the control engine will retrieve the execution durations of the subcommands 75 and 76 from the module executing the command 71 in order to calculate the start execution time of this master command 71. Once the start execution time of the master command 71 is established the start execution times of the slave commands before the master command, i.e. the negative slave command 70, can be calculated. When all start execution times of the negative slave commands are calculated, the start execution time of the chain is known.

All kernel level 2 and user level 1 functionality as described above according to the preferred embodiment may be implemented as software code and then compiled as processor instructions in order to have them executed on a processor. The kernel level functionality is preferably ran in a kernel level mode of the processor, i.e. the modules 20 and the control engine 8.

In order to further aid in the understanding of the invention, a detailed example will now be described implementing an IEEE 802.15.4e MAC protocol on a wireless sensor platform using the architecture illustrated by FIG. 1 and the preferred embodiment described above.

The MAC protocol is implemented on the RM090 hardware platform provided by Rmoni and iMinds. More information about the platform itself can be found at http://www.rmoni.com/en/products/hardware/rm090. The implementation of the user level 1 and kernel level 1 software functionality is done on top of the TinyOS operating system running on an MSP430f5437 processing unit. The processing unit is connected to a Texas Instruments 802.15.4 Chipcon wireless transceiver over a dedicated SPI bus and thus functions as the radio interface 16. The platform further provides an antenna switch chip 15 connected to the processing unit via General Purpose Input Output or GPIO lines.

Each module 20 in the TinyOS kernel space exposes the following narrow waist Command interface towards the control engine 8:

```
command TimeStampT estimateTime2FinalizeCommand (CommandT
    commandId, ParamT param , StateT blockingState);
async command uint32_t executeCommand (CommandT commandId,
    ParamT param, StateT blockingState);
async event void commandEvent (EventT cmdEvent , CommandT
    commandId, ErrorT error , uint16_t info , TimeStampT
    ts);
async command StateT getCurrentState( );
```

So the control engine 8 can call each one of these functions for each one of the modules 20. Each module 20 has its own set of commands but they can all be accessed by the control engine 8 through the same interface implemented by each module 20. It should be noted that the kewords command, async and event at the beginning of the functions are nesC related keywords and are not to be confused with the commands 11 and events related to the control engine 8. The estimateTime2FinalizeCommand function returns how long it will take to finalize a specific command taking into account the parameters param of the command. The duration to finalize to this commands takes both the execution and optional transition into account. Upon calling of the function, the timings are retrieved from a configurable lookup table within the specific module 20. The executeCommand function will actually execute the master command 21 or slave command 11 that is requested by the control engine 8. As a parameter, the control engine 8 can hereby specify one of the states of the module 20 to be blocking state. Therefore, when the module arrives at this blocking state, it will return a token back to the control engine 8 such that it can proceed to the next command in the chain while the respective module continues with the execution of the command. A module 20 can also throw a commandEvent to the control engine 8 if a certain event occurs. The getcurrentstate function will return the current state of the specific module if the module has states associated. If so, the module 20 may return a stable or transient state. This is then used by the control engine 8 in order to determine if a command can be executed by checking whether the module 20 is in a transient state.

Two types of modules have been used in the implementation on the RM090 platform. A first type are hardware abstraction modules of which the implementation is dependent on the underlying hardware they provide an abstraction for such as the modules 12 and 13 from FIG. 1. Therefore, these modules can be seen as drivers for the specific underlying hardware.

A first hardware abstraction module that can be associated with the module 12 of FIG. 1 is one that provides a hardware abstraction towards the radio interface 16, i.e. towards the IEEE 802.15.4 compliant CC2520 radio interface on the RM090 platform. This module contains the implementation of radio related commands and tracks the state of the radio in order to verify whether a command can be executed or not. The commands provided by this module 12 will be provide further below.

For the radio interface module 12, several states were defined according to the datasheet of the CC2520 radio chip 16 so that the control engine 8 can verify at any given moment if it is allowed, as dictated by the hardware 16, to perform a command or not. For example, according to the datasheet of the CC2520 chip it is not allowed to go from STATE OFF to STATE SLEEP. Therefore, 16 states were defined such that a 16 bit state mask can be used. Moreover, for each state and thus command, a time type and the time needed is specified. The time type indicates whether the time specified is a transition, an execution and whether there is a fixed portion and/or a variable portion, for example per bit. The table 1 below shows the commands and subcommands to perform the transmission of a packet.

TABLE 1

| Command | Allowed state mask | Time type | Time (μs) | Next state | Next cmd |
|---|---|---|---|---|---|
| TX | ST_ON, ST_RX | Execution | 4 | ST_2TX | 2TX |
| 2TX | ST_2TX | Transition | 192 | ST_TXFR | TXFR |
| TXFR | ST_TXFR | Fixed, per byte | 160 32 | ST_TXRX | TXRX |
| TXRX | ST_TXRX | Transition | 192 | ST_RX | NONE |

Now, if the control engine 8 wants an estimate of the time needed to finalize a command, it will be calculated from stable state to stable state. The example in Table 1 shows the total time needed for transmitting a frame. The TX command is only allowed if the radio state is ST_ON or ST_RX. If the allowed state matches with the current state, the command is executed. The next state of this command is ST_2TX which is a transient state. Since each command must end with a stable state, there is a next subcommand listed in the table. The 2TX subcommand needs a transition time of 192 μs, after which it is in ST_TXFR. The next command is TXFR. This will transmit the preamble and the complete frame. The preamble of 5 bytes needs a fixed time of 160 μs. Based on the length of the frame, the radio chip will need 32 μs per byte when transmitting the 2.4 GHz band. Once the frame is transmitted, another transition is needed to the stable state ST_RX. This is the turnaround time needed to switch the radio 16 to receive mode. This table can be configured when designing the module 12. If the module 12 would be transferred to a new platform using the same hardware interface 16, it would suffice to only change the values provided by Table 1.

Similarly to the first hardware abstraction layer, a second hardware abstraction module 13 provides the driver for the antenna switch chip 15.

Next to the hardware abstraction modules 12 and 13, a second type of modules or toolbox modules was implemented on the RM090 platform. These toolbox modules contain commands that are hardware independent making them reusable across different platforms. On the RM090 platform, two such toolbox modules were implemented: the Arithmetic Toolbox module corresponding to module 14 in FIG. 1 and the Data Plane Toolbox module corresponding to module 7 in FIG. 1.

The Arithmetic Toolbox module 14 implements commands related to arithmetic operations such as for example comparing variables, adding variables together, setting or checking a deadline and getting a random value.

The Data Plane Toolbox module 7, buffers incoming and outgoing frames, hereby avoiding the blockage of the radio interface 16 when multiple frames are received. The frames are then buffered in the module 7 before the user level MAC retrieves the frames and frees the memory. Additionally, the module 7 can store multiple frames waiting for transmission by the radio interface 16. The Data Plane Toolbox module exposes a data interface directly to the user level MAC:

```
command error_t postTxFrame (ChainT chainId, uint8_t* frame,
    uint16_t size);
event void txLoadFrameDone (ChainT chainId, uint8_t* frame);
command error_t postDataBuffer (ChainT chainId, uint8_t*
    buffer, uint16_t size) ;
event void completedDataBuffer (ChainT chainId, uint8_t*
    buffer, uint16_t size, TimeStampT start);
event void droppedDataBuffer (ChainT chainId, uint16_t size,
    TimeStampT start);
```

The postTxFrame function will enable the user level MAC to post multiple frames for transmission by the radio interface 16 depending on the capacity of the buffer. Posting a frame for transmission in the Date Plane Toolbox module buffers can be done at any time. It is the MAC logic provide by the chain of commands 9 that will decide when a frame can be actually transmitted. At the time of transmission dictated by the chain 9, a command implemented in the radio interface module 12 will get the next frame from the Data Plane Toolbox module 7. It is thus the buffer transaction interface 23 exposed by the radio interface module 12 that will be used for exchanging frames between the Data Plane Toolbox module 7 and radio interface module 12. Therefore, the transfer of frames between the two modules 7 and 12 is directly triggered by commands posted in the chain 9 of commands and is thus indirectly triggered from the user level MAC 4 through the chain 9. The txLoadFrameDone event will be signalled to the user level MAC 4 when the TxSignal (TxS) command is executed in the Data Plane toolbox (see further below for a listing of all commands implemented by the Data Plane Toolbox Module 7).

Similarly, there are also functions and events provided for the receiving part. The postDataBuffer function enables the user level MAC 4 to give the DataPlane Toolbox module 7 a buffer where it can store received data. The completedDataBuffer event will be signalled to the user level MAC when the RxSignal (RxS) command is executed (see further below for a listing of all commands implemented by the Data Plane Toolbox Module 7). If there is no buffer capacity left in the Data Plane Toolbox, the droppedDataBuffer event will be signalled to the user level MAC 4 for every frame retrieved by the radio interface module 12. The data interface 5 makes it possible for a user level MAC 4 designer to use a user level message queue and post pointers to queue entries to the Data Plane Toolbox module 7. This mechanism makes it possible to quickly integrate the control engine 8 solution with existing wireless stacks.

In order to instruct the modules to execute commands at the right moment, i.e. to call all negatives slave commands and the master commands at the exact moment where they need to be executed, the control engine 8 needs to be aware of the radio time. This is the time used by the radio interface 16 in order to meet the timings of the IEEE 802.15.4 specification. One possibility is to derive a clock for the radio time from the radio chip itself via the GPIO pins of the radio interface 16 and an external clock input on the microcontroller. However, the radio can only deliver a clock when it is active and keeping the radio active all the time in order to have a permanent clock would take a lot of energy and is thus not desirable in low-power applications. In order to derive the clock from the microcontroller running the TinyOS operating system, the symbol time used by the radio chip, i.e. 16 µs must be a multiple of the microcontroller's reference resolution, e.g. 1 µs. In order to achieve this, another crystal than the standard crystal on the RM090 platform was selected. Whereas the standard crystal has a natural frequency of 32768 Hz, the selected crystal has a natural frequency of 32000 Hz crystal with a deviation of +/−40 ppm. By using this crystal it is possible to use 1 µs symbol ticks which is 16 times smaller than the 16 µs symbol time in the 2.4 GHz band. This allows defining and executing the chain commands 11 and 21 in an accurate way such that the timings specified by the IEEE 802.15.4 standard can be met.

It is the task of the control engine 8 to interpret and execute the commands in the right order. In a simple embodiment of a chain, the commands may be executed in a sequential order. To allow more flexibility in implementing the MAC control logic on the RM090 platform, different types of command were defined. When a module is called to execute a certain command, the control engine passes and execution token to a command. It is then the commands that decides how the chain should proceed. By the types, different ways to proceed from one command to the other can be implemented. The different types of commands used are:

- The Continue or C type: this is the default command type. After execution of a C type command, the next command in the chain is executed. C type commands can be used anywhere in the chain, i.e. before or after the master command. The next command types are however not allowed as negative slave commands.
- The Skip on condition or S type: this type is used for commands that are verifying a condition, for example commands that check whether a certain bit is set or not. If the condition is not true, the next command in the chain will be executed. If the condition is true, the next command in the chain is skipped.
- The Skip on event or T type: this type is used for commands that are waiting on an event during a user defined duration implemented by a timer. If the timer expires and thus the event did not occur, the next command is executed. If the event occurs before the timer expires, the next command is skipped.

The control engine 8 also has four special commands implemented:

- The GOTO commands makes it possible to go to another command in the chain. An absolute value in the GOTO command indicates the command to go to. Typically a type S or type T command will appear before a GOTO command, allowing to take and alternative path in the chain.
- The JUMP command allows jumping to another command (designated by a relative offset) in the chain.
- The WTRG command waits for an event or a trigger from a module. Other commands must be used to check which event it was, e.g. frame that needs to be transmitted or frame received.
- The STOP command needs to be placed at the end of every chain. With this command, the chain can be automatically reloaded, kept in memory or destroyed by the control engine 8. If a STOP is executed, it will sequentially signal all the events to the user level MAC 4 to minimize the interference from further upper layers during the execution of a chain.

By combining the commands types with the above commands a complex chain can thus be implemented with several paths of commands or sub chains. As the timing of the chain must be guaranteed by the target chain execution time, this further splitting of a chain may not be performed before the master commands, i.e. for negative slave commands as this would render it impossible for the control engine 8 to calculate the slave execution times such that the master command gets executed by the target chain execution time.

Table 2 below lists the commands implemented by the Date Plane Toolbox Module 7 that can be used in the chains 9. The first column contains all the names of the commands, the second column specifies the type of the command, the third columns gives the parameters that may be passed along when calling the command and the last column provides a short description of the command. For example, the RxFM command will check if a 16-bit field at a given offset in a received frame matches with a given reference ref. A 16-bit mask can be applied to that 16-bit field in order to know if a certain bit is set or not. If it is set and thus the condition is true, the next command in the chain will be skipped. This generic command is very powerful and can be used in a chain to check if a bit in a received frame requesting a response with an ACK is set or not.

TABLE 2

| Command | Type | Parameters | Short description |
|---|---|---|---|
| RxTo | T | TimeStampT timeout; bool part; | Skip the next command if a (part of a) frame was received. Execute next command if timeout (To) is reached. |
| Rx | C | bool part; | Same as RxTo, but here we wait infinitely long. Execute the next command if a (part of a) frame was recevied. |
| TxTo | T | TimeStampT timeout; | Skip the next command if there is a frame posted in the TX buffer. Execute next command if timeout is reached. |
| Tx | C | n/a | Same as TxTo, but here we wait infinitely long. Execute next command when there is a frame posted in the TX buffer. |
| RxLM | S | uint16_t ref; TimeStampT timeout; | Skip if length ref of the received frame matches, with timeout. |
| RxFM | S | uint16_t rxOffset, mask, ref; | Skip the next command if a field at offset rxOffset with mask in the received frame matches with ref. |
| RxTxFM | S | uint16_t rxOffset, txOffset, mask; | Skip the next command if a field at offset rxOffset with mask in the received frame matches with a field at offset txOffset with mask in the top frame of the TQ buffer. |
| TxFM | S | uint16_t txOffset, mask, ref; | Skip the next command if a field at offset txOffset with mask in the top frame of the TX buffer matches with ref. |
| RxFC | C | uint16_t * dest; uint16_t rxOffset, mask; | 16 bit copy from offset rxOffset with mask in received frame to memory *dest. |
| RxCF | C | uint16_t * src; uint16_t rxOffset, mask; | 16 bit copy to offset rxOffset with mask in received frame from memory *src, with mask. |
| RxS | C | uint16_t signal | Signal the received frame to the upper layer if signal == 1. If signal == 0, drop the received frame and recycle the buffer. |
| TxS | C | uint16_t signal | Signal the transmitted frame to the upper layer if signal == 1. If signal == 0, destroy the transmitted frame and recycle the buffer. |

Similarly, table 3 below lists the commands implemented by the radio interface module comprising commands to steer the radio interface 16 that can be used in the chains 9. For each command the required start state, the stable end state—if applicable—and a short description is provided. All the commands are type C commands unless indicated otherwise.

TABLE 3

| Command | Start state | End state | Short description |
|---|---|---|---|
| Off | ST_NO-LPM2 | ST_OFF | Turn the radio off. |
| Sleep | ST_NO-LPM1_2 | ST_SLP | Turn the radio in sleep mode. |
| OnFromOff | ST_OFF | ST_ON | Turn the radio on (from off mode). |
| OnFromSleep | ST_SLP | ST_ON | Turn the radio on (from sleep mode). |
| OnFromRF | ST_ALL-RF | ST_ON | Turn the radio on (from RF-on mode). |
| RX | ST_ON | via subchain: ST_RX | Radio in receive mode (requires ON start state) |
| TX | ST_ON, ST_RX | via subchain: ST_RX | Transmit frame. |
| CcaTxFr | ST_ON, ST_RX | via subchain: ST_RX | First do CCA, if OK then transmit frame. |
| Scan | ST_ON | via subchain: ST_SCAN | Let the radio scan (symbol search is disabled) |
| SwitchChan | ST_NO-LPM1_2 | n/a | Change the channel. |
| LoadFr | ST_NO-LPM1_2 | n/a | Load frame in the radio chip. |
| Prom | ST_NO-LPM1_2 | n/a | Promiscous mode. |

TABLE 3-continued

| Command | Start state | End state | Short description |
|---|---|---|---|
| TxPwr | ST_NO-LPM1_2 | n/a | Change the transmit power. |
| AutoAck | ST_NO-LPM1_2 | n/a | Configure the auto ACK. |
| ScanRate | ST_NO-LPM2 | n/a | Configure the scan rate. |
| RSSI | ST_ALL-RF | n/a | Read the RSSI. |
| FlushRxB | ST_NO-LPM1_2 | n/a | Flush the receive buffer in the radio chip. |
| FlushTxB | ST_NO-LPM1_2 | n/a | Flush the transmit buffer in the radio chip. |
| FPTH | ST_NO-RX-LPM1_2 | n/a | Set the FIFOP threshold. |
| StartOfFrame | ST_ALL-RF | n/a | Trigger begin of the frame. (Type T) |
| StartOfFrameInf | ST_ALL-RF | n/a | Trigger begin of the frame, wait infinity. |
| EndOfFrame | ST_ALL-RF | n/a | Trigger end of the frame. (Type T) |
| EndOfFrameInf | ST_ALL-RF | n/a | Trigger end of the frame, wait infinity. |
| CcaControl | ST_NO-LPM1_2 | n/a | Configure the CCA parameter. |
| Cca | ST_ALL-RF | n/a | Trigger the CCA, rising edge or falling edge, with timeout. (Type T) |
| CcaInf | ST_ALL-RF | n/a | Trigger the CCA, wait infinity. |

In the same way that the modules expose an interface towards the control engine 8, the control engine 8 exposes the following interface towards the user level MAC 4 through the control interface 6:

```
command error_t postCommand (ChainT chainId, SlaveT slaveId,
    CommandT cmdId, ParamT param, StateT blockingState,
    bool eventOnExcec);
command error_t executeAt (ChaintT chainId, TimestampT valid,
    StateT referenceState);
command error_t executeNow (ChainT chainId);
command error_t removeChain (ChaintT chainId, SlaveT
    slaveId);
command uint16_t listAllCommands (uint8_t typeofInfo);
event void commandInfo (ChainT chainId, SlaveT slaveId,
    CommandT cmdId, uint16_t error, TimeStampT ts);
```

From the user level MAC 4, a unique chain identifier chainId has to be chosen in order to post all the commands and associated parameters for this chain one by one using the postcommand function. Each command in a chain needs a unique index number or slaveId. The master command in the chain is designated with slaveId zero. All the commands before the master command are called negative slaves, all the commands after the master command are called positive slaves. The slaveId can be used to refer to another command, for example when using the GOTO command. Posting commands from the user level 1 to the kernel level 2 only happens when new MAC protocol logic needs to be applied or when arguments of one or more scheduled commands need to be updated. In case of a new MAC protocol, all the commands must be posted once before the control engine 8 can execute this new chain. This chain is stored in the control engine 8, so that no further command control traffic between user level 1 and kernel level 2 is required after posting a complete chain. Posting a large number of commands of a new chain during the execution of an existing chain does not impact the execution of the existing chain. Furthermore, only one chain can be active at any given time. In case of updating the arguments of one or more commands, the updates are effective the next time the commands are executed. It is also within the postCommand function, that a state of a module can be designated as a blocking state blockingState. When this command is then executed and this blockingState is reached, the next command in the chain is immediately started.

Once a chain is completely posted, it can be started in two ways. The executeAt function lets the user level MAC 4 decide, at run-time, the time-accurate execution of a chain's master command. The user-defined time valid is then the target chain execution time and thus the time when the master command—or a subcommand of the master command—must be valid. The second way to start a chain 9 is by the executeNow function allowing the execution of the chain as soon as possible.

FIG. 5 illustrates the transmitter command chain needed for asynchronous multi-channel receiver-based communication in a non-beacon mode for use on the RM090 platform together with the control engine 8 and modules 7, 12, 13 and 14 as outlined above. This specific MAC logic handles a solution specified in the IEEE 802.15.4e standard where channel asymmetry between two devices may occur. The MAC logic is also known as asynchronous multi-channel adaptation. According to this MAC logic, each device will select its designated listening channel on which it wants to receive frames. Each transmitter will switch to the designated listening channel of the receiver. The receiver will check if an acknowledgment or ACK is requested in the data frame. If so, it will switch to the designated listening channel of the originator to send a software based ACK within the specified timing of the standard.

Considering the case the RM090 platform is used as a wireless sensor node, for example when it is attached to a machine and powered by an energy harvester, then it needs to transmit a sensor readout from time to time. The sensor node and thus the RM090 platform will sleep until it has harvested enough energy to perform the sensor reading and transmit it to an always-on receiver. The receiver will send a software ACK back if requested by the transmitter on the listening channel of the transmitter. The chain of commands 100 till 119 from FIG. 5 illustrates the main command chain on the RM090 platform executed to transmit a sensor readout to the always-on receiver according to the MAC logic described above.

Master command 100 will wait in infinitely long for a frame to be transmitted. Slave command 102 will turn on the radio from sleep. Slave command 103 will load the frame in the radio. Slave command 104 starts the actual transmission on channel 26. Slave command 105 will check if the transmitted frame has requested an ACK. If no ACK is requested, the transmission is successful and the GOTO slave command 106 will move on to slave command 116. Slave command 116 signals the transmission to the user level MAC 4. If slave command 105 determines that an ACK is requested, slave command 106 will be skipped and the reception of the ACK is prepared by commands 107 and 108. Slave command 107 switches the interface 16 to channel 12. Slave command 108 turns the interface 16 into receive mode. Slave command 109 waits for the start of a frame with a timeout of 672 µs. If no frame start is detected before this timeout, the GOTO slave command 110 moves on to slave command 117. However, if the start of a frame is detected slave command 110 is skipped. Slave command 111 then waits for 192 µs for receiving the ACK frame. If a complete frame is received, it is signalled to the user level MAC 4 by the slave command 13. In slave command 114 it is then checked if the sequence number is OK. If OK, slave command 115 is skipped and an acknowledged transmission is signalled to the user level MAC 4 in the slave command 116. Finally, after setting the channel to the designated channel 26 of the receiver by command 117, the radio is switched to sleep mode by command 118. Through the STOP command 119, the complete chain is reloaded and thus executed all over again after 15 µs.

Although the present invention has been illustrated by reference to specific embodiments, it will be apparent to those skilled in the art that the invention is not limited to the details of the foregoing illustrative embodiments and examples, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for time accurate execution of Media Access Control (MAC) logic on a processor able to drive a radio interface, the method comprising:
   receiving a chain of commands annotated with a target chain execution time;
   calculating start execution times for said commands based on said target chain execution time;
   executing said chain of commands on said processor at said start execution times,
   wherein said chain of commands comprises one master command and slave commands, said target chain execution time being annotated to said master command and indicative for when said master command should be executed, said slave commands being relative in time to said master command, and said calculating said execution times further includes
      calculating a master execution time that forms part of said execution times for said master command from said target chain execution time, and
      calculating slave execution times for said slave commands from said master execution time.

2. The method according to claim 1 wherein said commands are callable from appropriate modules able to execute a specific subset of said commands; and wherein said executing said chain of commands comprises:
   calling said commands at said execution times such that their execution starts in said appropriate modules at said execution times.

3. The method according to claim 2 wherein said calculating said execution times comprises:
   retrieving an execution duration for one of said commands from a respective module indicative for how long it needs to execute said one of said commands;
   calculating an execution time of said one of said commands from said execution duration, from already calculated execution times of other commands in said chain and from said master execution time.

4. The method according to claim 2 wherein a state keeping module of said modules able to execute a first command of said chain can be in a state comprising one of stable states or one of transient states; and wherein said first command can be a state changing command thereby changing said state upon execution or can be a non-state changing command thereby not changing said state upon execution; and wherein said executing said commands comprises:
   checking said state of said state keeping module;
   only calling said first command at said state keeping module if said first command is such a non-state changing command or if said first command is a such state changing command and said state keeping module is in a stable state.

5. The method according to claim 4 wherein said first command is such a state changing command and comprises a subchain of subcommands; and wherein said calling said commands comprises:
   executing said subcommands one after the other after said calling said first command in said state keeping module; whereby said state keeping module is in a first one of said stable states before executing said first command and is in a second one of said stable states after executing said subcommands and is in one of said transient states upon said executing said subcommands.

6. The method according to claim 5 wherein said subcommands comprise a first subcommand changing said state of said state keeping module to a first transient state of said transient states after executing said first command; and wherein said first transient state is designated as blocking by said first command; and said executing said subcommands comprises:
   executing said first subcommand in said subchain thereby changing said state to said first transient state designated as blocking;
   by said blocking proceeding to executing a next command in said chain of commands following said first command while continuing said execution of said subcommands related to said first command.

7. The method according to claim 5, wherein said chain of commands comprises one master command and slave commands; said target chain execution time being annotated to said master command and indicative for when said master command should be executed; said slave commands being relative in time to said master command; said calculating said execution times further comprising:
   calculating a master execution time that forms part of said execution times for said master command from said target chain execution time;
   calculating slave execution times for said slave commands from said master execution time;
   wherein said first command corresponds to said master command and wherein said target execution time is annotated to one of said subcommands indicative for when it should be executed.

8. The method according to claim 1 wherein said executing said chain of commands is repeatedly performed.

9. The method according to claim 1 comprising:
   receiving said chain of commands from a user level application running on said processor.

10. The method according to claim 1 comprising:
    receiving said chain of commands from a remote application running on another processor.

11. A non-transitory computer-readable storage medium having stored thereon instructions, which when executed by one or more processors of a computer system configure the computer system to perform the following steps for time accurate execution of Media Access Control (MAC) logic on the one or more processors that are able to drive a radio interface, the steps comprising:
    receiving a chain of commands annotated with a target chain execution time;
    calculating start execution times for said commands based on said target chain execution time;
    executing said chain of commands on said processor at said start execution times,
    wherein said chain of commands comprises one master command and slave commands, said target chain execution time being annotated to said master command and indicative for when said master command should be executed, said slave commands being relative in time to said master command, and said calculating said execution times further includes
       calculating a master execution time that forms part of said execution times for said master command from said target chain execution time, and
       calculating slave execution times for said slave commands from said master execution time.

12. A computer system including one or more processors and storage medium, the computer system configured to perform the following steps for time accurate execution of Media Access Control (MAC) logic on the one or more processors that are able to drive a radio interface, the steps comprising:
    receiving a chain of commands annotated with a target chain execution time;
    calculating start execution times for said commands based on said target chain execution time;
    executing said chain of commands on said processor at said start execution times
    wherein said chain of commands comprises one master command and slave commands, said target chain execution time being annotated to said master command and indicative for when said master command should be executed, said slave commands being relative in time to said master command, and said calculating said execution times further includes
       calculating a master execution time that forms part of said execution times for said master command from said target chain execution time, and
       calculating slave execution times for said slave commands from said master execution time.

* * * * *